March 12, 1963

R. V. WOODBURY 3,081,096

PRESSURIZED SEALS FOR THE SHAFTS OF FANS

Filed July 24, 1961

Inventor:
Roderick V. Woodbury,
by Robert J. Palmer
Attorney

March 12, 1963  R. V. WOODBURY  3,081,096
PRESSURIZED SEALS FOR THE SHAFTS OF FANS
Filed July 24, 1961
2 Sheets-Sheet 2
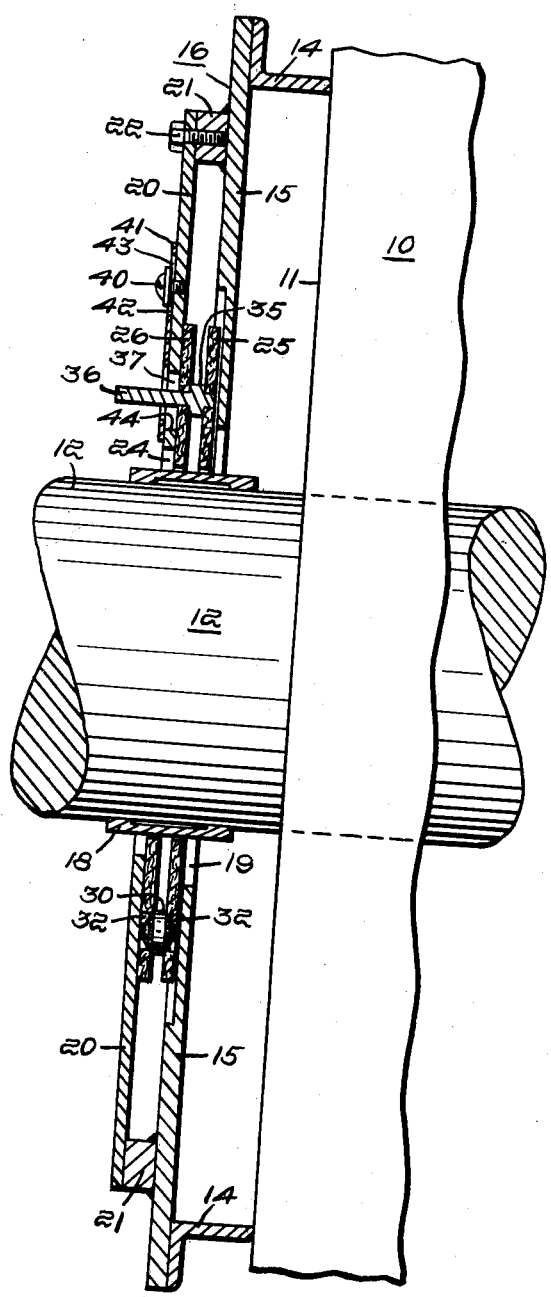
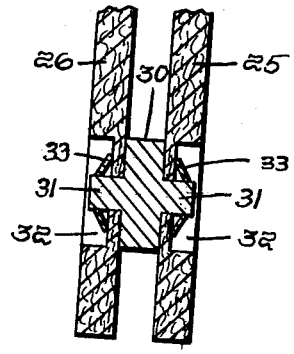
Inventor:
Roderick V. Woodbury,
by Robert T. Palmer
Attorney

# United States Patent Office 3,081,096
Patented Mar. 12, 1963

3,081,096
PRESSURIZED SEALS FOR THE SHAFTS OF FANS
Roderick V. Woodbury, Canton, Mass., assignor to Westinghouse Electric Corporation, East Pittsburgh, Pa., a corporation of Pennsylvania
Filed July 24, 1961, Ser. No. 126,254
4 Claims. (Cl. 277—4)

This invention relates to pressurized seals for the shafts of fans.

For preventing the escape of heated and corrosive gases around fan shafts where they extend through casing walls, it has been the practice with some types of fans to add so-called "pressurized seals" in which air under pressure is supplied into the seals to oppose the escape of gas. A typical seal of this type has used two, spaced-apart seal rings having small clearances around a wearing collar on a fan shaft, air under pressure being supplied into the space between the rings for opposing the escape of gas. A disadvantage of such a prior seal is that it is impossible to determine if the inboard seal ring is locked to the fan shaft or is free.

This invention provides a two-stage, pressurized seal which permits predetermined vertical and non-symmetrical horizontal growth of a fan casing while the fan is operating and changing temperature. An adjusting pin is attached to two, spaced-apart seal rings, and performs the functions of supporting the rings, of preventing their rotation, and of providing means for determining if the rings are locked or are free. After the fan has reached operating temperature, a locking plate on the outside of the seal housing is set so that the adjusting pin rests on the lower edge of an opening in the plate, with the rings having uniform clearance around a wearing collar on the fan shaft. Thereafter, it is only necessary to lift up on the adjusting pin to determine if the rings are free or are locked.

An object of this invention is to improve pressurized seals for the shafts of fans.

Another object of this invention is to provide means for determining if the seal rings of a pressurized seal are locked or are free.

This invention will now be described with reference to the annexed drawings, of which:

FIG. 2 is a section along the lines 2—2 of FIG. 1, and

FIG. 3 is an enlarged section through one of the spacers used for spacing the seal rings apart and for locking them together.

Figure 1:
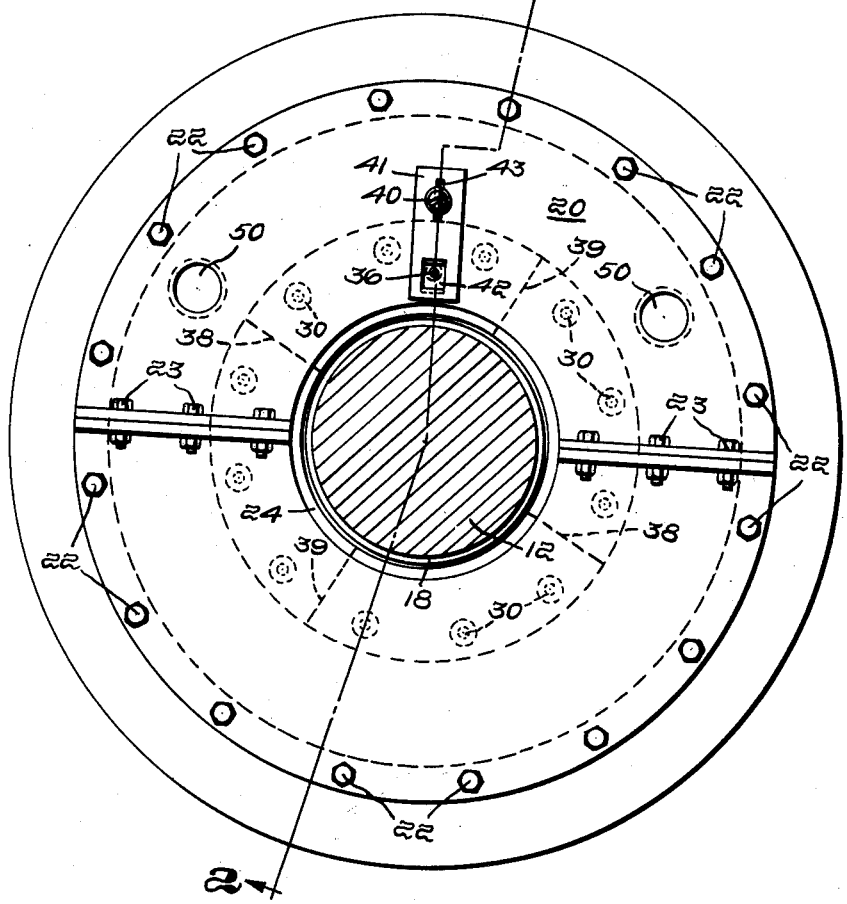
FIG. 1 is an end view of a pressurized seal embodying this invention.

A conventional induced draft or recirculation fan has a casing 10 with an outer, vertical wall 11 through which a fan shaft 12 extends to a bearing which is not shown. The rotor of the fan which is not shown, is within the casing 10. Attached to the outer side of the wall 11 by a ring 14 is a circular inboard plate 15 of two-stage, pressurized seal 16. The ring 14 is welded or otherwise suitably secured to the wall 11 and the plate 14 so as to form gas tight connections. The plate 15 has a central, circular, clearance opening 19 around a wearing collar 18 on the shaft 12. A circular, diametrically split, outboard plate 20 is attached to the inboard plate 15 by a spacer ring 21 which is welded to the plate 15, and by bolts 22. The plate 20 has a circular, central, clearance opening 24 around the collar 18. The two halves of the plate 20 are connected together by bolts 23 extending into flanges 27.

Diametrically split, axially spaced-apart, inboard and outboard seal rings 25 and 26 respectively, of hard asbestos are supported within the space between the plates 15 and 20 around the collar 18, and have central, circular, clearance openings around the collar 18 which have diameters slightly larger than the diameter of the collar. The rings 25 and 26 are split along diametrical lines 38 and 39 respectively, which extend at an angle of 90° to each other, and are connected together by spacers 30 between the rings, and by domed locking washers 33 in circular recesses 32 in the outer sides of the rings, the spacers having outer portions 31 of reduced diameter which extend into the recesses 32, and over which the washers 33 are forced. The use of the spacers 30 and washers 33 enables the split rings to be easily assembled. By placing the split lines of the rings 90° apart, they can be locked together even though split.

Attached to the seal rings 25 and 26 above the shaft 12 is an adjusting pin 36 which extends through an opening 37 in the upper half of the plate 20, and which has a spacer portion 35 between the seal rings. At the outer side of the upper half of the plate 20 is a locking plate 41 which has a rectangular opening 42 with horizontal upper and lower edges, opposite the opening 37, and through which the pin 36 extends. The plate 41 has a vertical slot 43 through which a locking screw 40 extends and which is threaded into the plate 20.

Before the fan is started cold, the screw 40 is loosened, and the locking plate 41 is moved vertically until there is no clearance between the top edge of the opening 42 and the pin 36 so that the plate 41 rests on the pin 36. After the fan has reached its operating temperature, the pin 36 is lifted until the seal rings have uniform clearance around the collar 18 so that there is no rubbing wear, following which the locking plate 41 is lifted vertically until the lower edge of its opening 42 is against the pin 36. The lock screw 40 is then tightened. Thereafter, it is only necessary to lift up on the pin 36 to determine if the seal rings are locked or are free.

The adjusting pin 36 thus supports the seal rings; it prevents rotation of the seal rings with the collar 18, and it provides means for determining if the seal rings are locked or are free.

The outboard plate 20 of the seal has in its upper half, spaced-apart, circular openings 50 beyond the edges of the seal rings, which are tapped to receive pipes for connecting them to a conventional source of compressed air which is not shown. Compressed air higher in pressure than that of the gas in the fan casing 10, is supplied through the openings 50 into the space between the seal rings 25 and 26, and passes through the clearance openings in the seal rings around the collar 18, to atmosphere through the clearance opening 24 in the outboard plate 20, and into the fan casing 10 through the opening 19 in the inboard plate 15, and the usual clearance opening in the wall 11 around the shaft 12. Gas is thus prevented from escaping from the casing along the shaft 12 where the latter extends through the wall 11.

What is claimed is:

1. A pressurized seal for a shaft of a fan having a casing with a back wall through which said shaft extends, comprising an inboard plate having a clearance opening for said shaft, means for spacing said plate from and attaching said plate to said wall with said opening around said shaft, an outboard plate having a clearance opening for said shaft, means for spacing said outboard plate from and attaching said outboard plate to said inboard plate with said last mentioned opening around said shaft, a pair of seal rings around said shaft within the space between said plates, means for spacing said rings apart and attaching said rings to each other, means for admitting air under pressure through said outboard plate and into the space between said rings, said outboard plate having another opening above said shaft, and an adjusting pin extending through said other opening and attached to said rings.

2. A pressurized seal for a shaft of a fan having a casing with a back wall through which said shaft extends, comprising an inboard plate having a clearance opening for said shaft, means for spacing said plate from and attaching said plate to said wall with said opening around said shaft, an outboard plate having a clearance opening for said shaft, means for spacing said outboard plate from and attaching said outboard plate to said inboard plate with said last mentioned opening around said shaft, a pair of seal rings around said shaft within the space between said plates, means for spacing said rings apart and attaching said rings to each other, means for admitting air under pressure through said outboard plate and into the space between said rings, said outboard plate having another opening above said shaft, an adjusting pin extending through said other opening and attached to said rings, a locking plate on the outer side of said outboard plate and having an opening opposite said other opening, said pin extending through said opening in said locking plate, said locking plate having a vertically extending slot, and means in said slot for attaching said locking plate to said outboard plate.

3. A pressurized seal for a shaft of a fan having a casing with a back wall through which said shaft extends, comprising an inboard plate having a clearance opening for said shaft, means for spacing said plate from and attaching said plate to said wall with said opening around said shaft, an outboard plate having a clearance opening for said shaft, means for spacing said outboard plate from said shaft, means for spacing said outboard plate from and attaching said outboard plate to said inboard plate with said last mentioned opening around said shaft, a pair of seal rings having clearance openings around said shaft, within the space between said plates, said rings being split along diametrical lines which extend at an angle of 90° to each other, means including a plurality of spaced apart spacers between said rings for spacing said rings apart and locking said rings together, means for admitting air under pressure into the space between said rings, said outboard plate having another opening above said shaft, and an adjusting pin extending through said other opening and attached to said rings.

4. A pressurized seal for a shaft of a fan having a casing with a back wall through which said shaft extends, comprising an inboard plate having a clearance opening for said shaft, means for spacing said plate from an attaching said plate to said wall with said opening around said shaft, an outboard plate having a clearance opening for said shaft, means for spacing said outboard plate from and attaching said outboard plate to said inboard plate with said last mentioned opening around said shaft, a pair of seal rings having clearance openings around said shaft, within the space between said plates, said rings being split along diametrical lines which extend at an angle of 90° to each other, means including a plurality of spaced apart spacers between said rings for spacing said rings apart and locking said rings together, means for admitting air under pressure into the space between said rings, said outboard plate having another opening above said shaft, an adjusting pin extending through said other opening and attached to said rings, a locking plate on the outer side of said outboard plate and having an opening opposite said other opening, said pin extending through said opening in said locking plate, said locking plate having a vertically extending slot, and means in said slot for attaching said locking plate to said outboard plate.

References Cited in the file of this patent

UNITED STATES PATENTS

| | | |
|---|---|---|
| 2,859,053 | Phelps | Mar. 4, 1958 |
| 2,908,516 | Stein | Oct. 13, 1959 |
| 3,026,113 | Etterman | Mar. 20, 1962 |
| 3,039,779 | Laird | June 19, 1962 |